(12) United States Patent
Chan (10) Patent No.: US 9,661,954 B2
(45) Date of Patent: *May 30, 2017

(54) SPILL PROOF CONTAINER (71) Applicant: MUNCHKIN, INC., Van Nuys, CA (US)

(72) Inventor: Sung Yun Chan, Pasadena, CA (US)

(73) Assignee: Munchkin, Inc., Van Nuys, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,257

(22) Filed: Sep. 25, 2015

(65) Prior Publication Data
US 2016/0007805 A1  Jan. 14, 2016

Related U.S. Application Data (63) Continuation of application No. 13/895,196, filed on May 15, 2013, now Pat. No. 9,144,337.

(60) Provisional application No. 61/647,253, filed on May 15, 2012.

(51) Int. Cl.
| A47G 19/30 | (2006.01) |
| A47J 47/02 | (2006.01) |
| B65D 25/28 | (2006.01) |
| B65D 41/04 | (2006.01) |
| B65D 51/18 | (2006.01) |
| A47J 47/00 | (2006.01) |
| B65D 43/02 | (2006.01) |

(52) U.S. Cl.
CPC .............. *A47J 47/02* (2013.01); *A47G 19/30* (2013.01); *B65D 25/28* (2013.01); *B65D 41/04* (2013.01); *B65D 43/0204* (2013.01); *B65D 51/18* (2013.01); *A47J 47/00* (2013.01); *B65D 43/02* (2013.01); *B65D 2251/009* (2013.01); *B65D 2251/0018* (2013.01); *B65D 2251/0028* (2013.01); *B65D 2251/0078* (2013.01); *B65D 2525/283* (2013.01)

(58) Field of Classification Search
CPC . A47J 47/02; A47J 47/00; A47J 19/30; B65D 43/02; B65D 25/28; B65D 41/04; B65D 43/0204; B65D 51/18; B65D 2251/0018; B65D 2251/0028; B65D 2251/0078; B65D 2251/009; B65D 2525/283; A47G 19/30
USPC .... 220/200, 212.5, 694, 758, 759, 375, 810, 220/288, 315; 222/469, 470; 215/386
See application file for complete search history.

(56) References Cited

U.S. PATENT DOCUMENTS

| 3,321,798 | A | 5/1967 | Plamondon |
| 4,600,112 | A | 7/1986 | Shillington et al. |
| 5,044,512 | A | 9/1991 | Giancaspro et al. |
| 6,223,397 | B1 | 5/2001 | Prevot et al. |
| 9,144,337 | B2 * | 9/2015 | Chan ...................... A47G 19/30 |
| 2004/0112896 | A1 | 6/2004 | Lewis |
| 2006/0096987 | A1 | 5/2006 | Wry |
| 2012/0223077 | A1 * | 9/2012 | Claypool ........... B65D 43/0222 220/315 |

(Continued)

Primary Examiner — Fenn Mathew
Assistant Examiner — Elizabeth Volz
(74) Attorney, Agent, or Firm — Robert Z. Evora, Esq.

(57) ABSTRACT

A spill proof container assembly having a receptacle, a non-spill lid and a handle assembly. The handle assembly including a cover disposed at a first end and a sleeve disposed at a second end. The cover and handle pivot about a sleeve connection between an open position and a closed position.

20 Claims, 8 Drawing Sheets (56) References Cited

U.S. PATENT DOCUMENTS

2013/0098915 A1* 4/2013 Del Solar .............. B65D 51/00
  220/288
2013/0098933 A1* 4/2013 Del Solar .............. B65D 43/02
  220/810

* cited by examiner

SPILL PROOF CONTAINER

CROSS REFERENCE TO RELATED APPLICATION

This application is a continuation and claims priority to U.S. Non-Provisional Application Ser. No. 13/895,196 filed on May 15, 2013, now U.S. Pat. No. 9,144,337, which claims priority to U.S. Provisional Patent Application Ser. No. 61/647,253, filed May 15, 2012; the contents of which are hereby incorporated by reference herein in their entirety into this disclosure.

TECHNICAL FIELD

The subject disclosure relates generally to food or small item containers and, more particularly, to an anti-spill container for food or other small items.

BACKGROUND

Various small food goods, generally consumed between regular meals, are often packaged in disposable cartons or plastic bags. As opposed to carrying the larger box, the small construction of an individual serving size is convenient during a snack time when the person is not sitting at a table using conventional tableware. Unfortunately, not eating at a table frequently leads to spilling of some of the food upon the individual eating and/or on the floor. Especially, when a small infant learns to feed themselves, they frequently spill food from containers and create a mess. Traditionally, removable lids have also been added; however, once the lid is removed they are frequently lost, misplaced and/or difficult to relocate. Unfortunately, this deficiency has never been addressed previously.

BRIEF DESCRIPTION OF THE DRAWINGS

Various exemplary embodiments of this disclosure will be described in detail, wherein like reference numerals refer to identical or similar components or steps, with reference to the following figures, wherein.

DETAILED DESCRIPTION

Particular embodiments of the present invention will now be described in greater detail with reference to the figures.

Figure 1:
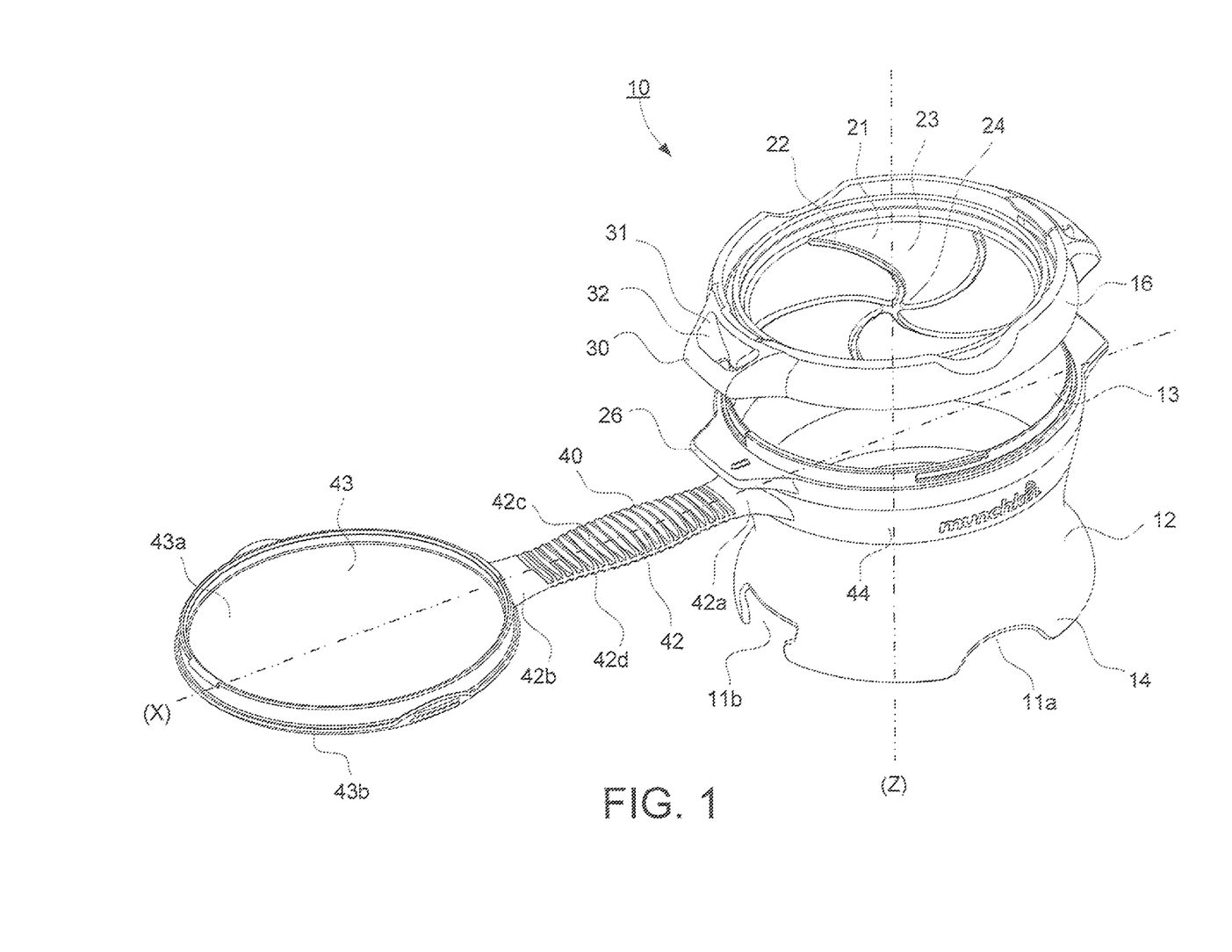
FIG. 1 illustrates an exemplary container assembly according to the subject disclosure.

FIG. 1 illustrates an embodiment for a non-spilling container assembly 10 for small items. The container assembly 10 includes a receptacle 12 with a non-spill lid 16 and a folding and/or pivoting handle assembly 40.

Various small items can be used with the non-spilling container assembly, including but not limited to for example, crackers, cookies, chopped fruits and vegetables, popcorn, shelled nuts, potato chips, dry cereal, candies, raisins or other snack food.

Figure 2:
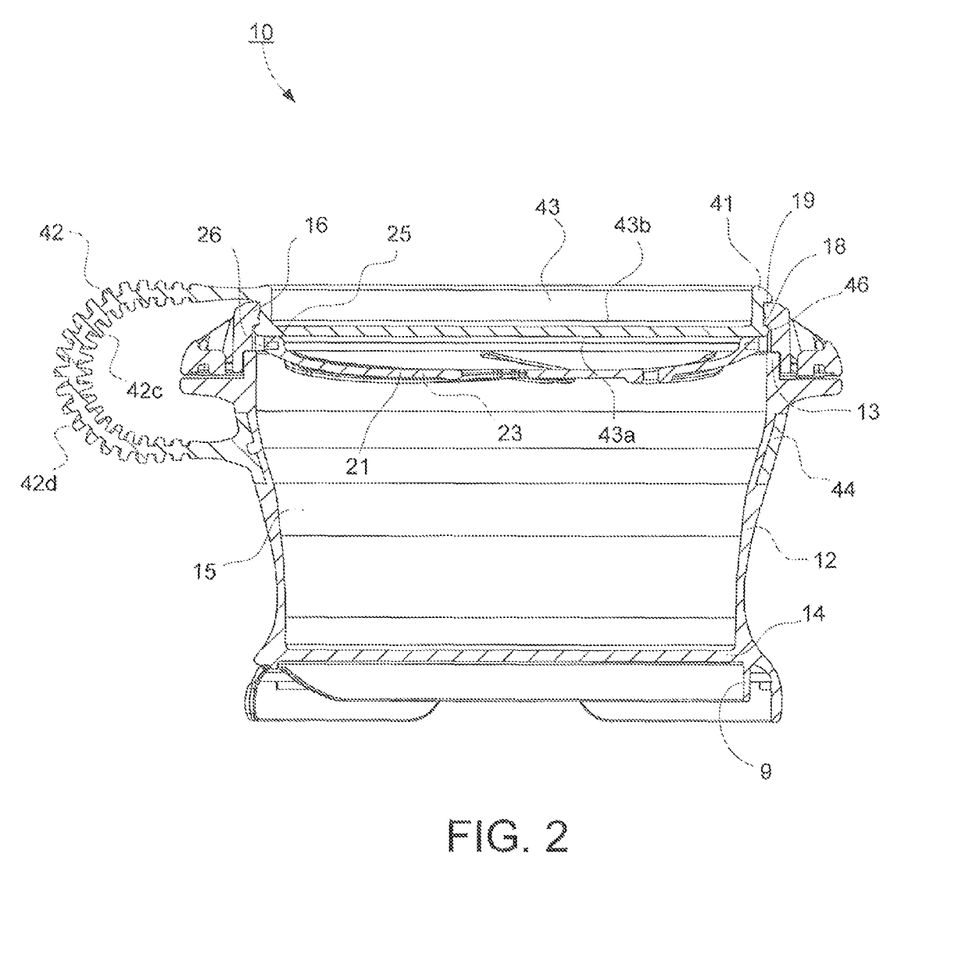
FIG. 2 shows a cross section view of the container assembly.

FIG. 2 shows in more detail a cress section of the container assembly 10. The receptacle 12 includes an inner chamber 15 defined by an open top 13 and a closed bottom 14. The container assembly 10 is generally cylindrical in shape. However, it is to be understood that the container assembly 10 may take any preferred shape. The interior chamber 15 of receptacle 12 is adapted to receive various items.

The container assembly 10 is preferably made of an unbreakable material, such as plastic, and may be either opaque or transparent. The receptacle 12 may be composed of a rigid cup made preferably of a transparent plastic so as to permit viewing of the food item contained therein. The container assembly 10 may take any number of different sizes and shapes, such as cylindrical or frusto-conical shaped side walls, a circular flat bottom 14 and/or any other suitable shape in accordance with the present disclosure.

The collar or lid 16 is positioned at the open top 13 of the container assembly 10. The lid 16 may be fastened to the top 13 of the receptacle 12 by a threaded attachment. The lid 18 may include a rounder body having an inner surface with at least one thread defined thereon. As shown in FIG. 1, a first wing 30 protrudes from a first side of the rounded main body of the lid 16 that facilitates gripping of the lid 16 by a user.

An audible feedback structure 31 is provided that includes a viewing port 32. The viewing port 32 is constructed in the lid 16 body for viewing a portion of a second wing 26 of the receptacle 12 in order to visually verify proper alignment of the first wing 30 of the lid 16 on the second wing 26 of the receptacle 12. The angle of the viewing port 31 is constructed to provide an acoustic waveguide that produces an audible feedback when the lid 16 is screwed onto the receptacle 12 with a predetermined tightness.

Figure 3:
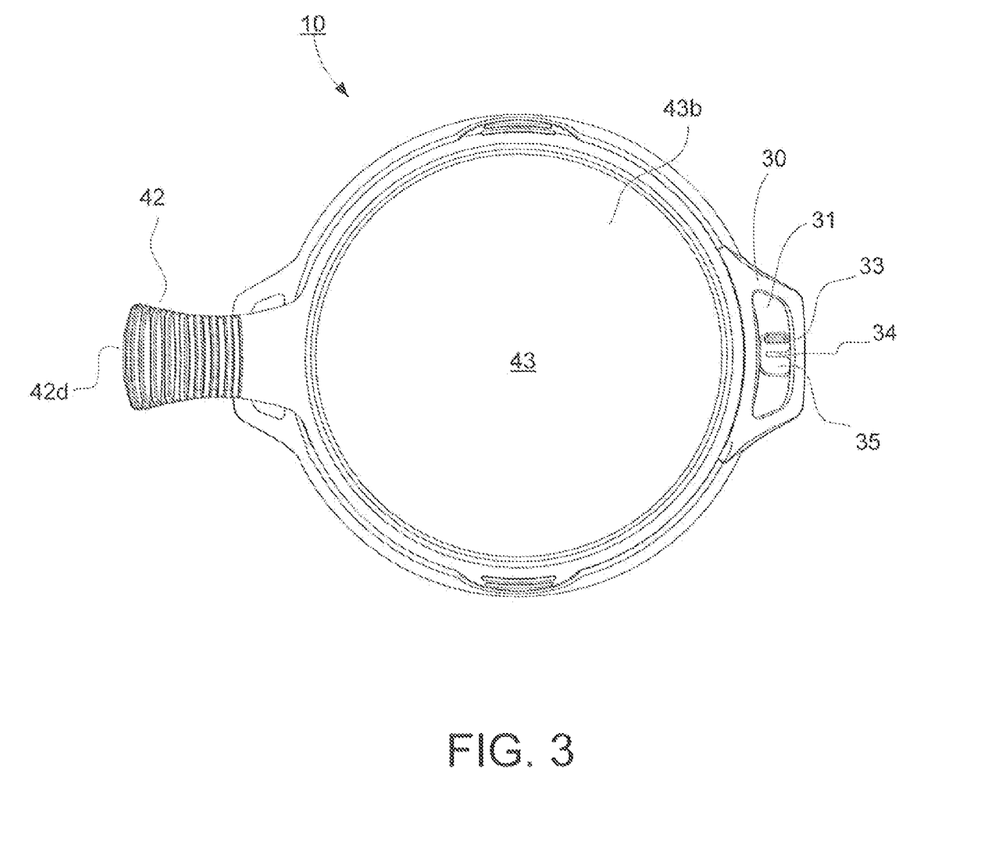
FIG. 3 shows a top view of the container assembly.

As shown in FIG. 3, the audible feedback structure 31 further includes a snap projection 33 for engaging and temporarily restraining a flexible tab 34 while the lid 16 body moves with respect to the receptacle 12 toward the predetermined optimum closed position. The snap projection 33 is embodied on a snap ridge that projects upwardly from a raised platform 35 that is located at the uppermost portion of the respective second wing 26. Alternatively, the snap projection 33 could be a single or multiple bumps or posts, which could work individually or as a group to engage the flexible tab 34.

Although the lid 16 is described as a threaded fastener fit, it is to be understood that the lid 16 may be attached to the receptacle 12 with a snap-fit construction and/or any suitable means used to detachably secure lid 16 to the receptacle 12.

The lid 16 includes a separate flexible non-spill barrier or diaphragm 21 that extends across and covers the open top 13 of the lid 16 when the lid 16 is placed over and attached to the top 13 of the container assembly 10. The diaphragm 21 may be constructed flat, being molded of a flexible rubber, a stamped resilient plastic, and/or any other suitable flexible material. The flexible non-spill barrier or diaphragm 21 may be constructed to be fixedly attached or removable from the rigid lid 16.

Referring back to FIG. 1, the diaphragm 21 includes a plurality of crossing slits 22 across a center of the non-spill barrier 21 to form a circular row of tongues 23 there between. Pointed ends 24 of the tongues 23 abut each other at the center of the diaphragm 21. At rest, the tongues 23 close the interior chamber 15 of the receptacle 12, and the food may be retained therein.

As shown in FIG. 2, the diaphragm 21 may be provided with a projecting recess 25 disposed around a peripheral edge of the diaphragm 21. The projecting recess 25 is composed of a resilient material, and extends around the outer periphery of the diaphragm 21. The projecting recess 25 may be formed integrally with the flexible diaphragm 21, or as two separate components. The lid 16 is constructed with an annular flange 26 that matingly fits into the recess 25 to align and secure the diaphragm 21 onto the lid 16 in a sufficiently secure manner to prevent removal by a young child or the like. However the diaphragm 21 may be removed for cleaning purposes.

The diaphragm 21 may be constructed of a flexible material that will not scratch or otherwise injure a hand inserted through the flexible portion or diaphragm 21 and into the inner chamber 15 of receptacle 12 to grab and withdraw an item of food in the receptacle 12. Also, the flexible material of the diaphragm 21 will allow the inserted hand to extricating easily and safely without without scratching or otherwise injuring the hand and without catching the hand so as to make withdrawal of the food item difficult. Once the hand is removed from receptacle 12, the flaps of the diaphragm 21 return to their original position covering open top 13 of receptacle 12. It is to be noted that the diaphragm 21 may also be constructed of a transparent material and/or may be of a one-piece construction with the remainder of the lid 16.

The flexible diaphragm 21 may be formed of a variety of different materials, including but not limited to a durometer 65-95, using standard test method ASTM D 2240, and a tear strength of greater than 200 lb/in, using standard test method ASTM D-1044 and/or any other suitable material capable of retaining the shape memory of the plastic material to ensures that the flaps of the diaphragm 21 will return to their original position despite multiple deflections of flaps by one inserting their hand there-through.

Various materials, for example, may include thermoplastic polyurethane (TPU) or thermoplastic polyesters (TPE), polyolefin Elastomers (POE). Other commercially available materials may include Engage, Sarlink, Toxin, Desmopan, Dynaflex, Versalloy, Versaflex, and Elastolan. It should be noted that some or all of the above commercially available materials may be trademarks of the companies' manufacturing and/or selling the materials.

Figure 4:
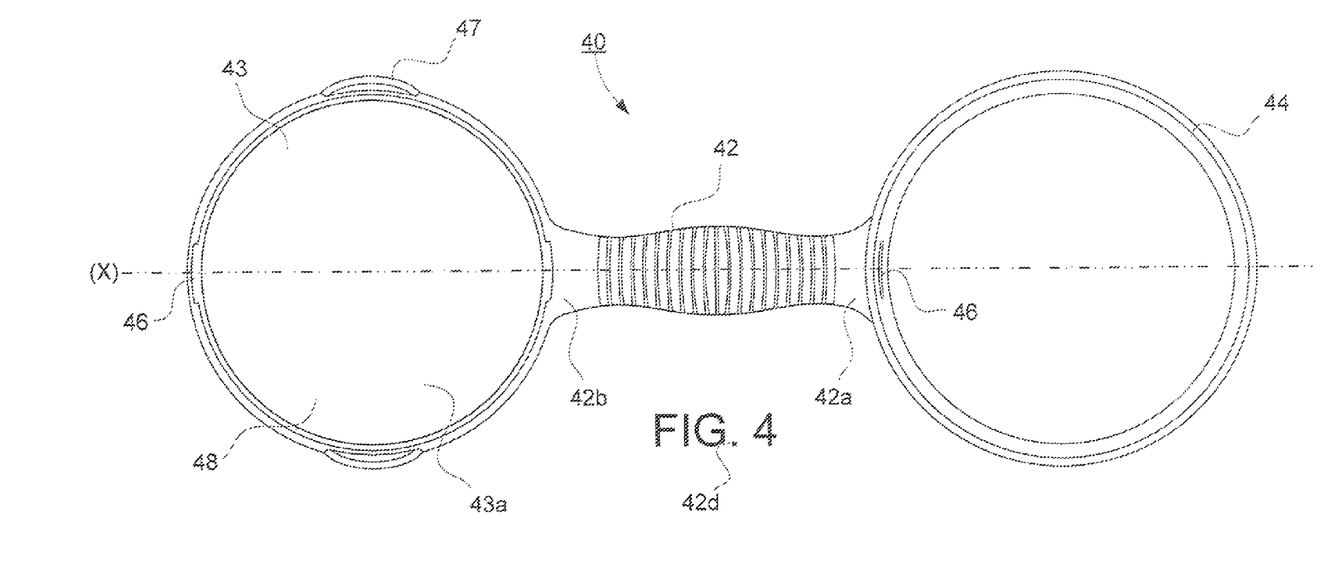
FIG. 4 shows a top view of the pivoting cover assembly for the container assembly.
Figure 5:
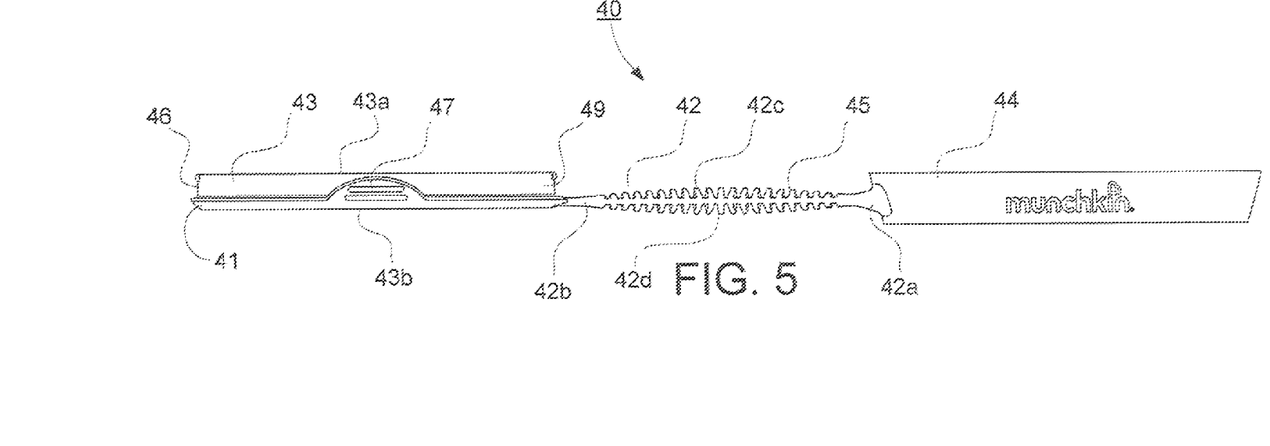
FIG. 5 shows a side view of the pivoting cover assembly for the container assembly.

FIGS. 1, 4 and 5 show the folding and/or pivoting handle assembly 40 attached to the receptacle 12 of the container assembly 10. The handle assembly 40 includes a flexible handle 42 having a first end 42a and a second end 42b. In one exemplary embodiment as shown in FIG. 1, the first end 42a of the flexible handle 42 may be attached to a sleeve 44, and the second end 42b may be attached to a cover 43. It is to be understood and discussed later with respect to FIGS. 7-8 that the first end 42a of the sleeve 42 may be integrated as part of the receptacle 12 or the lid 16.

The flexible handle 42 may be configured as a flat strip of a flexible material having a first side 42c and an opposite second side 42d. The first side 42c and/or the opposite second side 42d may include a plurality of small protuberances or gripping nubs 45.

The gripping nubs 45 are convenient for a user gripping the handle 42 while in use. As shown, the gripping nubs 45 are centrally disposed on the first side 42c and/or opposite second side 42d of the handle 42. As shown, the gripping nubs 45 may increase in size from each end 42a, 42b of the handle 42 to a center portion thereof. Likewise, the gap between each of the nubs enables bending to easily occur and to form the looped handle 42.

As shown, in FIGS. 4-5, the flexible handle 42 is a single-piece flat flexible member having a first side 42c and an opposite second side 42d. The flexible handle 42 has an elongated axial length (X) between the first end 42a and the second end 42b. The handle 42 is resilient and adapted to pivot about the first end 42a that may be attached to the sleeve 44, the receptacle 12, the lid 16 or other component therefore. The flexible handle 42 may be selected from a variety of flexible materials, such as rubber and/or other suitable material capable of enduring repetitive bending or folding upward into a first upward curled closed position as shown in FIG. 6, and a downward oppositely curled or folded open position as shown in FIG. 9.

Figure 6:
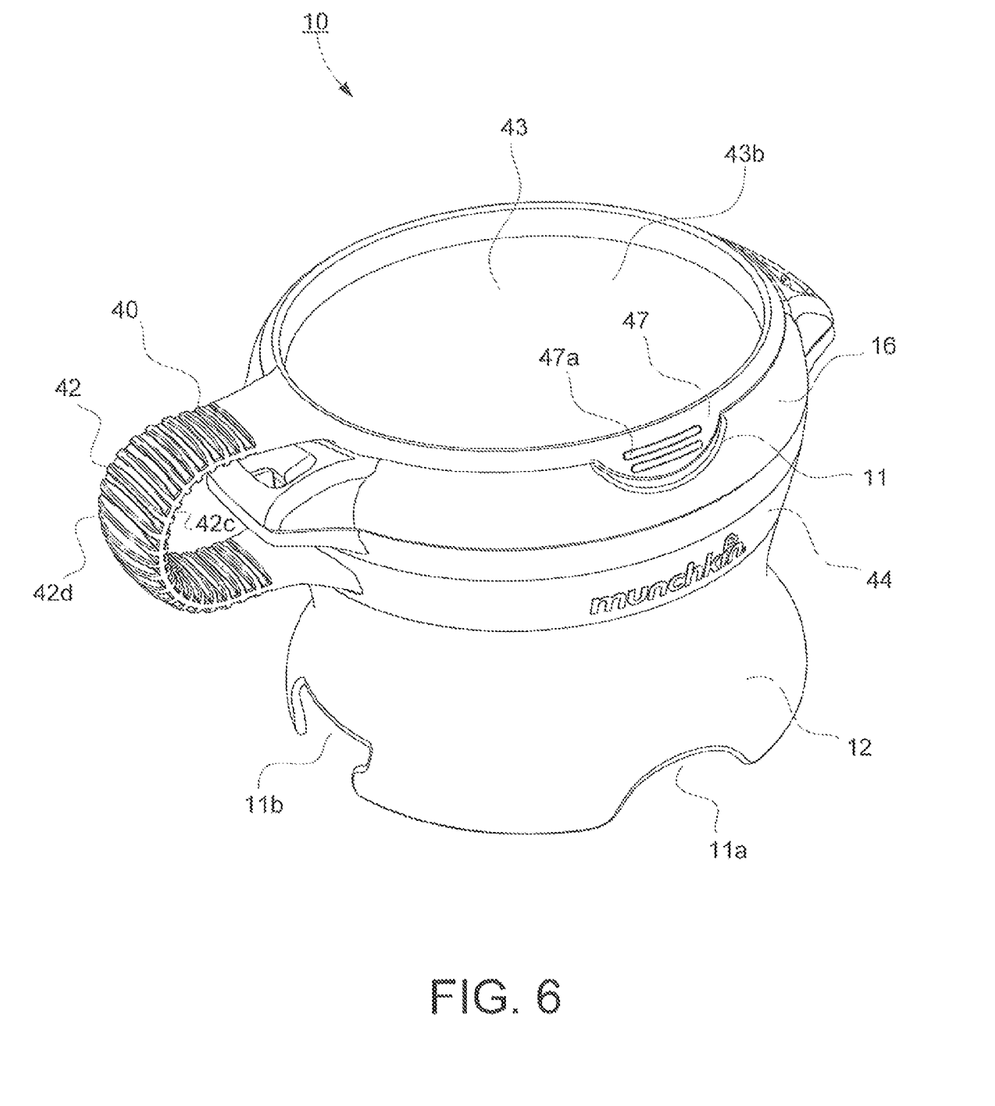
FIG. 6 shows a perspective view of the pivoting cover assembly in a closed position.

As shown with the cover 43 in a first closed position over the lid 16 in FIG. 6, the flexible handle 42 is curled over and upward so that the cover 43 can be located on top of the lid 16. At all times, the peripheral edges of the flat length of the handle 42 remain contiguous between the first end 42a and the second end 42b during and throughout the process of securing and moving the handle 42 between the first upward curled closed position (as shown in FIG. 6) and the downward curled open position (as shown in FIGS. 9-10). In both the first upward curled closed position and the downward curled open position, a full closed loop is formed by the handle 42. Likewise, when the first end 42a of the handle 42 is moved between the first upward curled closed position and the downward curled open position, the center of elongated axial length (X) between the first end 42a and the second end 42b of the handle 42 travels at all times in a plane (the (X-Z) plane shown in FIG. 1) parallel and through the center axis (Z) of the container assembly 10.

In the first closed position, the first side 42c of the flexible handle 42 is provided inside of a loop formed by the flexible handle 42, and the opposite second side 42d of the flexible handle 42 is provided outside of the loop formed by the flexible handle 42. A first side 43a of the cover 43 faces downward toward the receptacle 12, while an opposite second side 43b of the cover 43 faces upward away from the receptacle 12.

Figure 9:
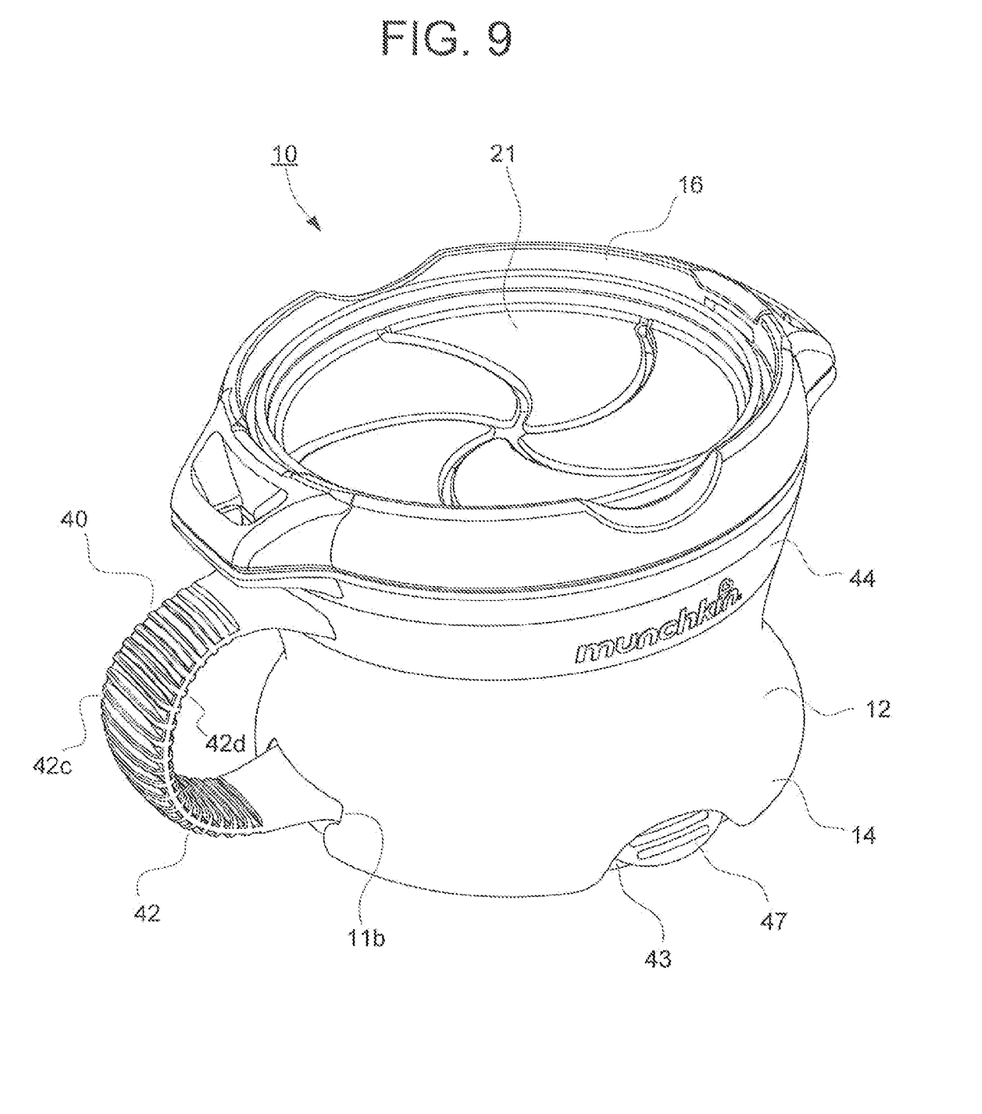
FIG. 9 shows a perspective view of the pivoting cover assembly in an open position.
Figure 10:
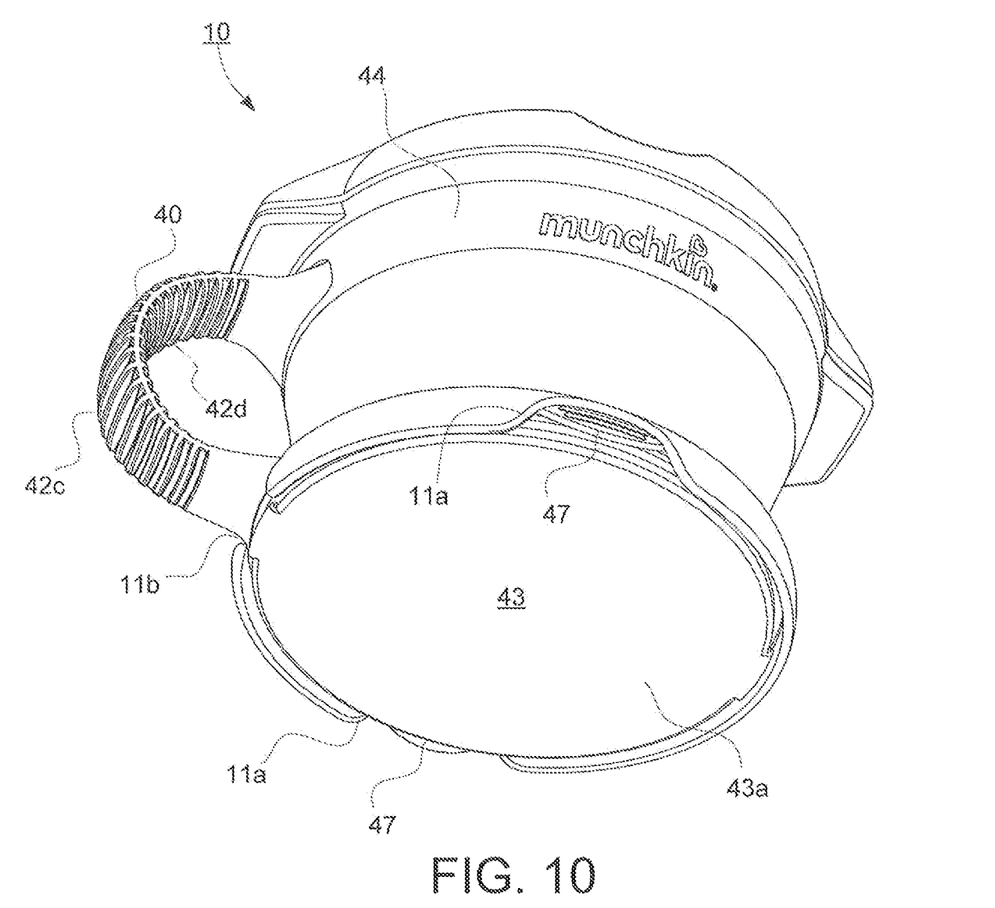
FIG. 10 shows a lower perspective view of the pivoting cover assembly in an open position.

As shown in a second open position in FIGS. 9-10, the cover 43 is provided in the recess 9 at the bottom of the receptacle 12. That is, the flexible handle 42 is inverted, and curled downward so that the cover is positioned into the recess 9 disposed at the bottom of the receptacle 12. In this position, the second side 42d of the flexible handle 42 is provided inside of the loop formed by the flexible handle 42, and the first side 42c of the flexible handle 42 is provided outside of the loop provided by the flexible handle 42. Contrary to the closed position described above, in this open position, the first side 43a of the cover 43 is inverted facing downward away from the receptacle 12, while the opposite second side 43b of the cover 43 is also inverted facing inward into the recess 9 toward the receptacle 12.

The cover 43 also includes a closed surface 48 surrounded by a projection lip 49 extending from the closed surface 48. The cover 43 may include various locking tabs 46 for engaging and locking the cover 43 onto the lid 16 of the container assembly 10. The cover 43 may also include various gripping alignment tabs 47 for aligning the cover 43 onto the lid 16. Likewise, the cover 43 includes an extended peripheral edge 41 to mate with an upper surface 19 of the lid 16 when the cover 43 is placed over top 13 of the receptacle 12.

In use, the pivoting handle assembly 40 of the container assembly 10 is movable from a first closed position to a second opened position.

FIG. 6 illustrates the pivoting handle assembly 40 in the first closed position. As shown in FIGS. 2 and 6, the sleeve 44 is provided around the receptacle 12. The sleeve 44 can be co-molded into the receptacle 12 in order to provide a secure nonmoving grip around the receptacle 12. Likewise, the sleeve 44 can be over-molded or removably placed anywhere on the receptacle 12.

Figure 7:
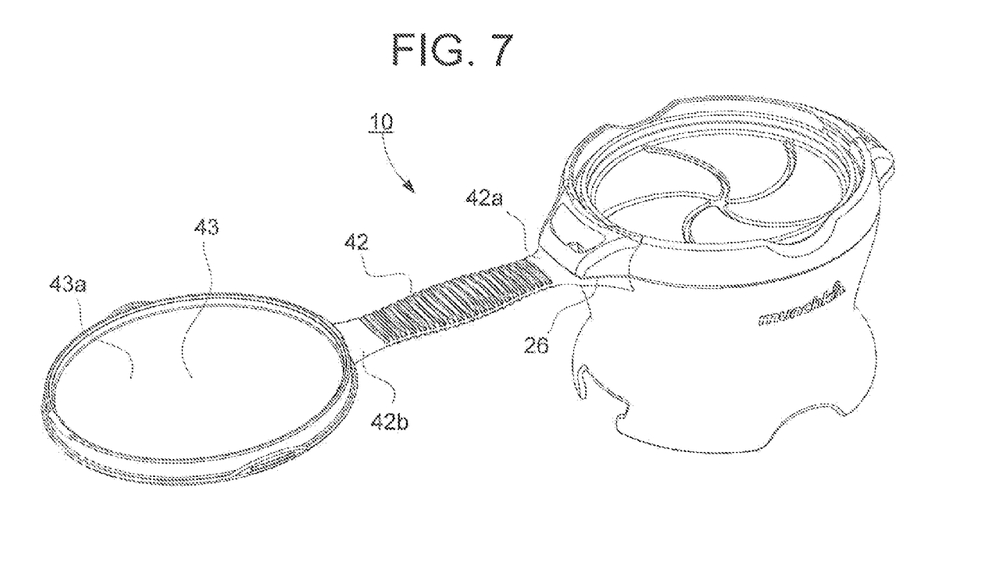
FIG. 7 shows an alternate construction for the pivoting cover assembly for the container assembly.
Figure 8:
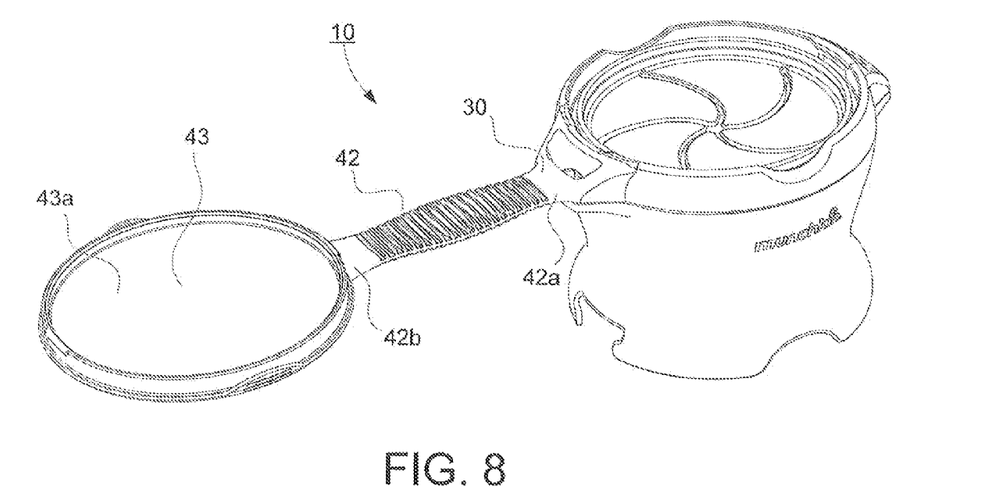
FIG. 8 shows another alternate construction for the pivoting cover assembly for the container assembly.

FIGS. 7-8 demonstrate the versatility with which the pivoting handle assembly 40 may be constructed as part of the container assembly 10. In FIG. 7, the handle 42 may be integrated as part of the lower wing 26 portion of the receptacle 12. The pivoting handle assembly 40 may be constructed as a separable or unitary part that extends from the lower wing 26 of the receptacle 12 outward. Alternatively, the pivoting handle assembly 40 may include an internal recess adapted to receive the shape of the lower wing 26 of the receptacle 12 and extends there from.

Alternatively, FIG. 8 shows the handle 42 may be integrated as part of the upper wing 30 portion of the lid 16. Likewise, the pivoting handle assembly 40 may be constructed as a separable or unitary part that extends from the upper wing 30 of the lid 18 outward. The pivoting handle assembly 40 may also have an internal recess into which the upper wing 30 of the receptacle 12 fits within, and extends there from. Although a couple examples are described herein, it is to be understood that they are not limiting and the pivoting handle assembly 40 may be constructed separable or integral with various other parts and constructions of the container assembly 10.

Referring back to FIG. 6, the cover 43 of the pivoting handle assembly 40 is placed over, and sealed on the open top 13 of the receptacle 12. The handle 42 is bent outward from the sleeve 44 and upward creating a circular loop shape of the handle 42 onto which a user may grasp.

As shown in FIG. 2, in position, the locking tab 46 engages a mating locking flange 18 disposed on the interior of the lid 16. Further, the extended peripheral edge 41 of the cover 43 mates with an upper surface 19 of the lid 16 to complete the seal between the cover 43 and the lid 16. Alignment tabs 47 are positioned within mating recesses 11 and constructed in the side wall of the receptacle 12. The recesses 11 permit a user to easily grip the alignment tabs 47 to remove the cover 43 from on top of the receptacle 12. Raised bumps 47a may be placed on the alignment tabs 47 to make gripping and removal of the alignment tabs 47 easier.

FIGS. 9-10 show the cover 43 of the pivoting handle assembly 40 in a second open position at the lower end 14 of the receptacle 12. The handle 42 extends outward from the sleeve 44 and bends downward creating the circular loop shape of the handle 42 onto which a user may grasp. The cover 43 of the pivoting handle assembly 40 is placed into a recess 9 (as shown in FIG. 2) disposed in the bottom 14 of the receptacle 12 as shown in FIG. 2. The end of the handle 42 is positioned within another recess 11b that receives the end of the handle 42 when it secured into the recess 9 at the bottom of the receptacle 12.

In position, the cover 43 may be locked into the recess 9 in a friction fit manner. Alternatively, the locking tab 46 may engage another mating locking flange disposed on the interior wall of the recess 9 at the bottom of the receptacle 12. The extended peripheral edge 41 of the cover 43 may be adapted to mate with another flange and/or lower surface locking element to secure the cover 43 to the bottom of the receptacle 12. As shown, the alignment tabs 47 are positioned within mating recesses 11a constructed in the lower side wall of the receptacle 12. The recesses 11a permit a user to easily grip the alignment tabs 47 to remove the cover 43 from the bottom side of the receptacle 12.

Although the container assembly 10 has been described as an anti-spill container assembly for snack food, it will be understood that container assembly 10 has a variety of other uses. For example, container assembly 10 could also be used as a container for small non-food items, such as a jewelry container, a coin change container, a small hardware parts container assembly and/or any other suitable use for carrying and preventing the spillage of various items. As such, the anti-spill container assembly may be implemented in a virtually unlimited number of different applications.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

What is claimed:

1. A spill proof container assembly comprising:
a receptacle having a closed end and an open end;
a non-spill lid fastened to the open end of the receptacle;
a handle assembly having a cover attached to a flexible handle at a first end, wherein the flexible handle pivotally folds between:
an open position, where the cover is secured to a recess in the closed end of the receptacle and a first side of the cover faces outward and away from the receptacle; and
a closed position, where the first side of the cover is secured to the non-spill lid and faces downward toward the receptacle; and
a structure that provides audible feedback when the non-spill lid is in a predetermined position with respect to the receptacle, wherein a first portion of the structure is defined on the non-spill lid and a second portion of the structure is defined on the open end of the receptacle.

2. The spill proof container assembly recited in claim 1, wherein the receptacle has a visual indicator provided on an upper surface thereof and the non-spill lid has a viewing port defined in a first side thereof, such that the visual indicator is visible through the viewing port when the non-spill lid is fully secured onto the receptacle.

3. The spill proof container assembly recited in claim 1, further comprising a flexible diaphragm connected to the non-spill lid that extends across the open end of the receptacle when the lid is attached to the receptacle.

4. The spill proof container assembly recited in claim 3, wherein the flexible diaphragm defines a plurality of slits to form a plurality of tongues there between.

5. The spill proof container assembly recited in claim 1, wherein the first portion of the structure comprises a flexible tab and the second portion of the structure comprises a snap projection.

6. The spill proof container assembly recited in claim 5, wherein the snap projection engages a lower surface of the flexible tab while the non-spill lid moves concentric with respect to the receptacle toward a predetermined closed position.

7. The spill proof container assembly recited in claim 6, wherein the snap projection deflects the flexible tab in a direction tangential to a generally round body of the non-spill lid.

8. The spill proof container assembly recited in claim 5, wherein the flexible tab is cantilevered substantially near a first side of the non-spill lid.

9. The spill proof container assembly recited in claim 5, wherein the snap projection is embodied as a snap ridge that projects upwardly from a raised platform.

10. A spill proof container assembly comprising:
   a receptacle having a closed end and an open end;
   a non-spill lid fastened to the open end of the receptacle;
   a reversible handle having a cover attached at a first end, wherein the cover and reversible handle pivotally fold between:
      an open position, wherein the cover is secured to a recess in the closed end of the receptacle and a first side of the cover faces outward and away from the receptacle;
      a closed position, where the first side of the cover is secured to the non-spill lid and faces downward toward the receptacle;
   a flexible diaphragm connected to the non-spill lid that extends across the open end of the receptacle when the lid is attached to the receptacle; and
   an audible feedback structure having a first portion defined on the non-spill lid and a second portion defined on the receptacle.

11. The spill proof container assembly recited in claim 10, wherein the reversible handle forms a closed loop in both the open and the closed positions.

12. The spill proof container assembly recited in claim 10, wherein the first portion of the audible feedback structure is a flexible tab having a lower surface, and the second portion of the audible feedback structure is a snap ridge that projects upwardly from a raised platform located near the open end of the receptacle.

13. The spill proof container assembly recited in claim 12, wherein the non-spill lid is threadedly fastened to the receptacle, and when the non-spill lid is twisted onto the receptacle with a predetermined tightness, the snap ridge engages the lower surface of the flexible tab.

14. The spill proof container assembly recited in claim 10, wherein the non-spill lid has a viewing port wherein a portion of the receptacle is visible through the viewing port when the non-spill lid is fastened to the receptacle.

15. The spill proof container assembly recited in claim 14, wherein the viewing port is constructed as an acoustic waveguide.

16. A spill proof container assembly comprising:
   a receptacle having a closed end, an open end, a raised platform defined adjacent to a portion of the open end, and a handle assembly;
   a non-spill lid that connects to the open end of the receptacle, the non-spill lid having a flexible tab and a flexible diaphragm;
   a handle assembly having a cover attached to a flexible handle at a first end, wherein the flexible handle pivotally folds between:
      an open position, where the cover is secured to a recess in the closed end of the receptacle and a first side of the cover faces outward and away from the receptacle; and
      a closed position, where the first side of the cover is secured to the non-spill lid and faces downward toward the receptacle; and
   a structure disposed on the raised platform in communication with the flexible tab for producing an audible feedback when the non-spill lid is twisted onto the receptacle with a predetermined tightness.

17. The spill proof container assembly recited in claim 16, wherein the flexible diaphragm comprises a plurality of tongues that close an interior chamber of the receptacle.

18. The spill proof container assembly recited in claim 16, wherein the flexible handle has a cover attached at a first end, and a second end attached to the receptacle, wherein the cover is secured to a recess in the closed end of the receptacle when in an open position.

19. The spill proof container assembly recited in claim 16, wherein the structure comprises a snap projection for engaging and temporarily restraining the flexible tab while the non-spill lid is screwed onto the receptacle with the predetermined tightness.

20. The spill proof container assembly recited in claim 19, wherein the flexible tab has a fixed end attached to the non-spill lid and a free end, such that the free end cams itself over an upper surface of the snap projection.

* * * * *